United States Patent [19]
Nielsen et al.

[11] 3,816,044
[45] June 11, 1974

[54] AUTOMATIC PRESS

[75] Inventors: Harold R. Nielsen; Leo J. Hagenson, both of Kenyon, Minn.

[73] Assignee: Foldcraft Company, Goodhue, Minn.

[22] Filed: Feb. 7, 1973

[21] Appl. No.: 330,393

[52] U.S. Cl. ............... 425/157, 425/343, 425/385, 425/389, 425/406
[51] Int. Cl. ............................................ B29c 3/06
[58] Field of Search .......... 425/150, 157, 343, 385, 425/389, 406

[56] References Cited
UNITED STATES PATENTS

| | | | |
|---|---|---|---|
| 2,411,043 | 11/1946 | Klassen | 425/406 X |
| 2,859,478 | 11/1958 | Glasson | 425/408 |
| 3,066,725 | 12/1962 | Schweitzer | 425/343 X |
| 3,099,061 | 7/1963 | Marchioti et al. | 425/389 X |
| 3,115,678 | 12/1963 | Keen et al. | 425/343 |
| 3,158,089 | 11/1964 | Fillol | 425/389 X |

Primary Examiner—Robert L. Spicer, Jr.
Attorney, Agent, or Firm—Neil B. Schulte

[57] ABSTRACT

An automatic hot press for forming contoured laminated bench seats utilizing an overhead pivotable heated die to form the inside of the bench against three lower heated dies which form the outside surface of the bench. The central lower heated die is positioned against the sharply curving portion of the bench between the seat and back portions before the other lower dies so as to insure proper forming and prevent cracking of the bench. The entire operation of the press is automatically sequenced with a pressurized air system.

10 Claims, 9 Drawing Figures

AUTOMATIC PRESS

BACKGROUND OF THE INVENTION

It has become popular today to form one piece bench seats for commercial establishments by heat forming various laminate materials into contoured benches. The laminating materials may comprise sheets of wood or plastic or combinations thereof which are glued together and pressed with suitable dies into the desired shape and held in that position while the glue cures. The dies are generally heated to quicken the glue curing process. The prior art machines that have been used for forming these benches generally employ a pair of dies to secure the seat portion and two additional dies to secure the back portion. The seat and back portions are then bent into a generally perpendicular relationship to form a contoured seat shape. The bench is held in this position until the glue cures and the bench is capable of remaining in the desired shape. The trouble with this procedure is that the sharply curved section of the bench between the seat and back portions often does not form in quite the desired shape. Even worse the laminated materials often tend to concentrate all of the stress at a single point causing a crack along the stress point between the seat and back portions. In the past this has been accepted as an unavoidable problem associated with this process. Our invention, however, overcomes this problem and at the same time provides a more reliably shaped and more accurately reproducible product.

SUMMARY OF THE INVENTION

Briefly, our invention contemplates a single heated die which is pivoted down from above onto the laminated stock. This single die forms the entire finished surface of the seat and back portions as well as the sharply curved portion connecting the seat and back portion. This surface is the one that people would sit on in the finished product and is referred to herein as the inside surface. The opposite or outside surface is formed by a combination of three different dies mounted on the main frame of the machine which are brought up from below by a series of air inflatable bags to completely press the laminated material up against the single inside forming die.

One unique feature of our invention involves using one outside die for the seat portion, one outside die for the back portion, and a third outside die for the sharply curved connecting portion. This third die is brought into position first to carefully mold the sharply curved portion thus relieving it of any stress concentration effect that might come from bending the seat portion relative to the back portion. Once this sharply curved portion is held in place by the third outside die the first and second outside dies can be raised against the seat and back portions to complete the molding process. This new and novel approach insures that the benches will never crack during forming and that they will always be molded in exactly the desired shape.

Another unique feature of our invention involves the use of a radius rod to locate the third outside die relative to the frame of the machine and unique pivoting connecting links to locate the seat and back forming die relative to the third die. These connecting links extend between the three outside dies to that they are located accurately relative to each other. This greatly simplifies the problem of positioning the outside dies and eliminates the necessity of precision guide members or mechanisms on the main frame of the press.

Still another novel advantage arises from the structure of our invention in that all of the motions of the components therein are automatically sequenced by the machine itself. Each subsequent motion is dependent upon the successful completion of the previous motion. Included in the sequence are a number of safety locks which prevent accidental injuries. Thus, it may be seen that it is an object of our invention to provide an improved press for forming laminated bench seats. It is a further object of our invention to provide such a press which consistently produces accurately shaped benches without danger of cracking and further which is completely safe in operation. Further objects and advantages will become apparent upon consideration of the following description and drawings.

DESCRIPTION OF THE PREFERRED EMBODIMENT

Figure 1:
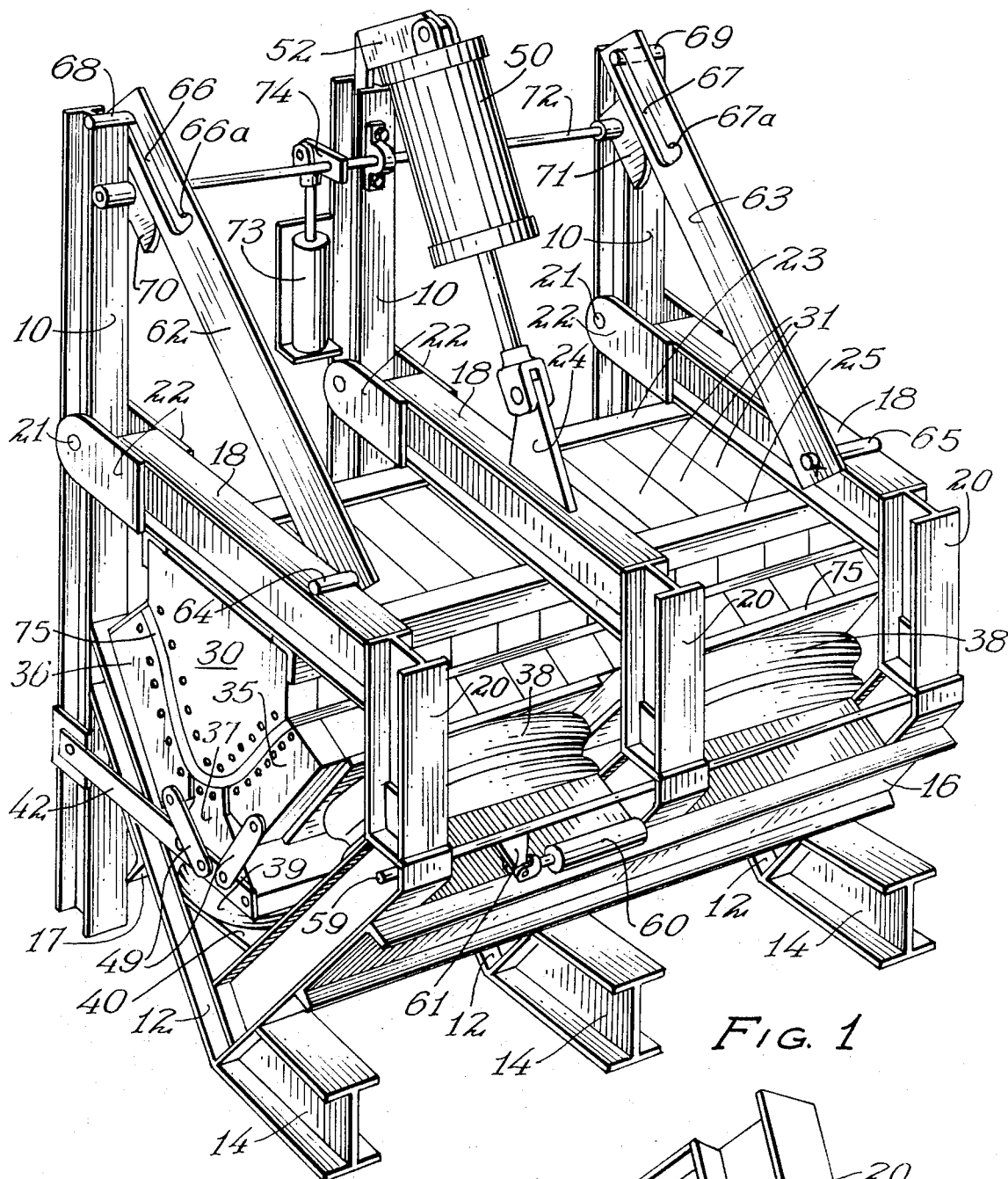
FIG. 1 is a perspective view of the press of our invention.
Figure 2:
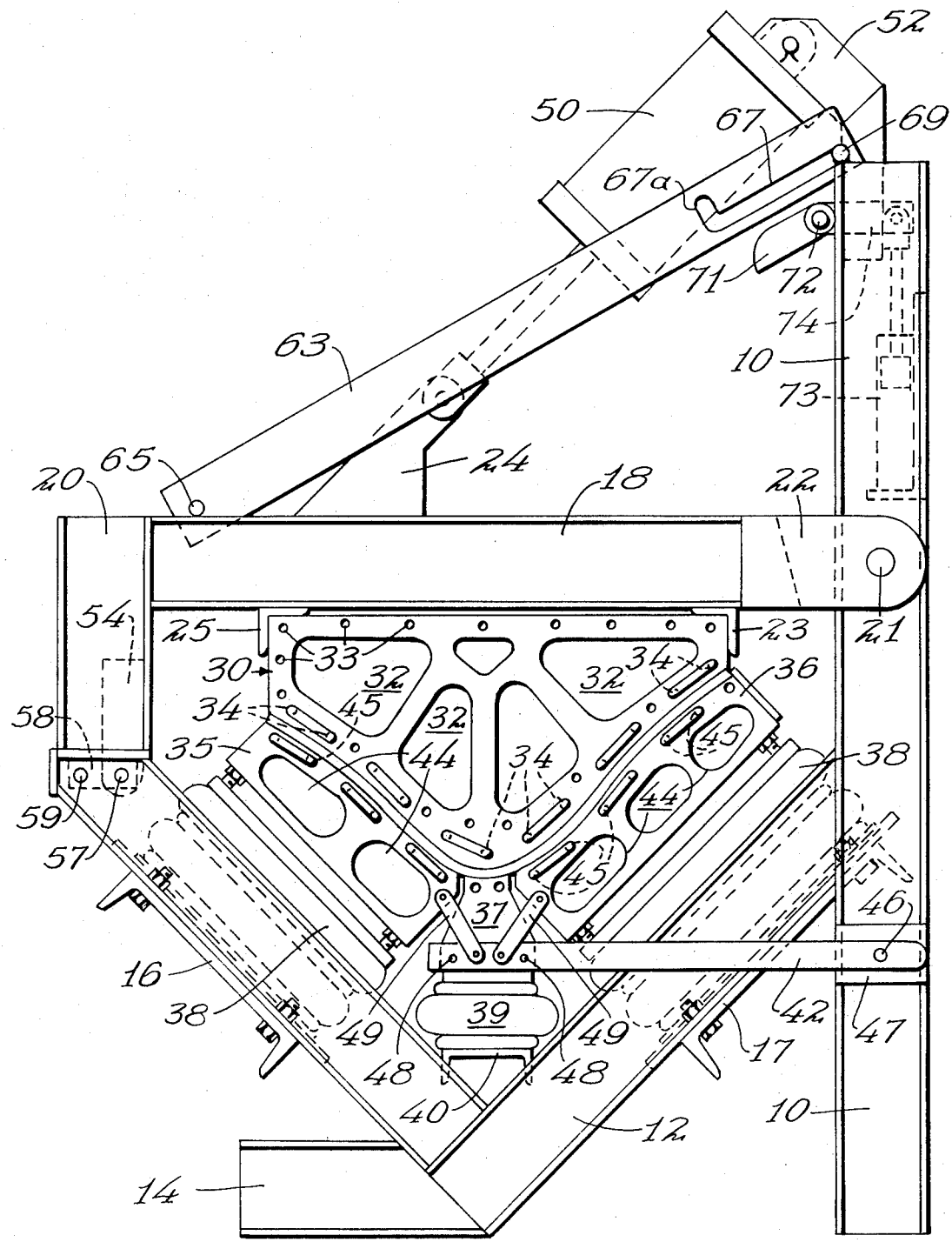
FIG. 2 is an end view of the press as shown in FIG. 1 to facilitate a complete understanding of the detailed construction thereof.

Referring simultaniously to the perspective view of FIG. 1 and the end view of FIG. 2, the hot press of the instant invention is shown. An overall main frame is formed by three upright I-beam type girders 10 which are securly welded to three V-shaped support members 12 which extend down from girders 10 to the floor and back up again to accommodate the pivoting subframe mounted above which will be described in detail later. The three V-shaped main frame girders 12 are connected together by two transverse beams 16 and 17 which are welded to each of the V-shaped girders 12. Transverse beam 17, which is more easily visible in FIG. 2, extends across the V-shaped girders 12 on the back side. Additional small extensions 14 are provided to further anchor the main frame to the floor. In the preferred embodiment the vertical girders 10 have been secured to a wall behind the machine and therefore are firmly located laterally. If desired the machine may be made free standing and these girders amy be connected together by any suitable cross member welded into position.

Figure 5:
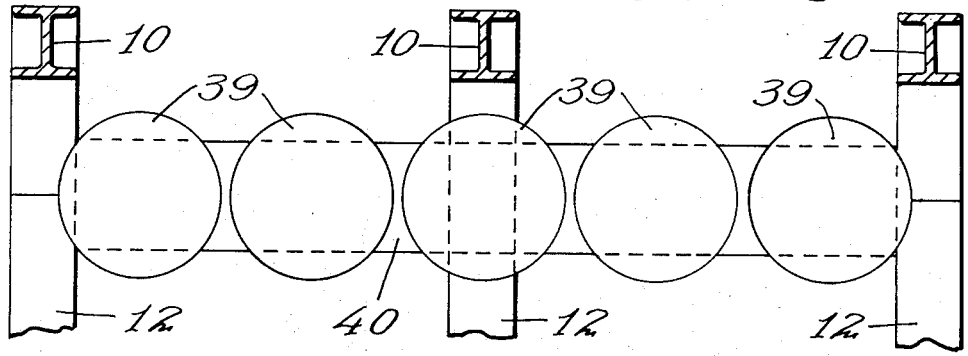
FIG. 5 is a schematic plan view diagram showing the placement of the air inflatable bags for the central outside die.

A pivoting subframe assembly is formed by three horizontal girders 18 which are welded to suitable brackets 22 so that they may be pivoted on girders 10 about suitable pivot pins 21. Girders 18 are connected together laterally by a pair of angle iron members 23 and 25. Angle members 23 and 25 also serve to retain and locate an inside die 30. As can be seen in FIG. 1 die 30 is formed from a series of identical aluminum wafers 31 which are held together lengthwise by long bolts (not shown). In FIG. 2 it may be seen that each wafer 31 has a number of openings 32 formed in it to reduce the overall weight of die 30. A number of small passage ways 33 are formed in each aluminum wafer 31 to accommondate the lengthwise bolts that hold the entire die together. A number of channels 34 are also formed in the wafers to accommodate lengthwise tubes which channel hot fluids such as water in order to heat the die for the forming process. A similar composite construction is used to form the three outside lower dies 35, 36 and 37. As can be seen in FIG. 2 these three outside dies are also provided with lightning holes 44 and channels 45 to accommodate heating tubes. The lower outside dies 35 and 36 that form the back portion and the seat portion of the bench rest on air bags 38 which bags in turn are supported by transverse beams 16 and 17. As can be seen in FIG. 1 there are two air bags 38 for each of the outside dies 35 and 36. The small central die 37, however, is supported by five smaller air bags 39 which are laid out according to the plan view of FIG. 5. These smaller bags 39 rest on a lengthwise member 40 which is nested in the intersection of the V-shaped members 12.

The exact position of central lower die 37 is controlled by a pair of radius rods 42 which extend out from the main frame upright girders 10. Each radius rod 42 pivots about a bolt 46 mounted in a plate 47 which is welded to girder 10 at the ends of the press. The other end of the radius rod 42 is bolted to the ends of central die 37. The bolts 48 used to secure radius rod 42 to die 37 may be slightly adjustable in position so that die 37 can be brought into contact with the sharply curved portion of the bench in exactly the correct and desired position. Once this motion is completed the air bags 38 are inflated to bring up outside dies 35 and 36 into position. As can be seen in FIG. 2 small pivoting connecting links 49 extend between central die 37 and the other two outside dies 35 and 36. Connecting linsks 49 insure that dies 35 and 36 make contact with the bench in exactly the correct position relative to central die 37. Little lateral guidance need be supplied by air bags 38. As air bags 38 expand and force dies 35 and 36 toward the bench, dies 35 and 36 are pivoted by connecting rods 49 into close proximity with central die 37.

Figure 4:
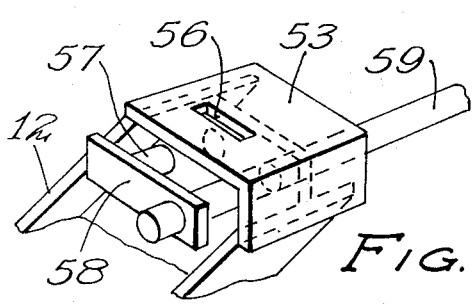
FIG. 4 is a detail view of an accepting slot in the lower main frame which accepts the locking member apparatus shown in FIG. 3.
Figure 3:
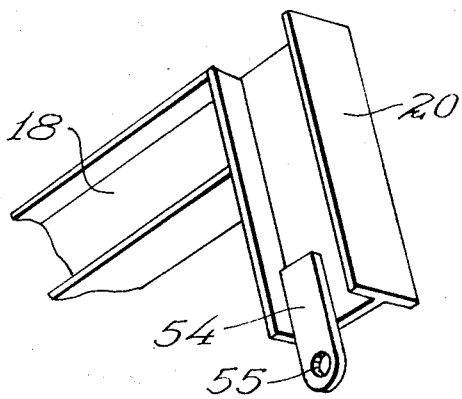
FIG. 3 is a detail view of the locking member part of the pivoting, inside die carrying subframe.

Still referring to FIGS. 1 and 2 it may be seen that a large air cylinder 50 is mounted between a bracket 24, welded to the pivoting subframe on the central horizontal girder 18, and a bracket 52 which is welded to the central upright girder 10. Air cylinder 50 is used only to lift the subframe assembly and inside die 30 up and away from the bench. This permits the formed bench to be removed from the press and a new piece of laminated stock to be introduced thereinto. To lower the subframe and the inside die into position, air is allowed to escape from cylinder 50 as that the subframe can slowly pivot down about pivot bolts 21 under its own weight. As the air escapes from cylinder 50 and the subframe pivots down, it finally comes to rest with the vertical members 20 of the subframe encountering the ends of the V-shaped members 12. Reference should be had to FIGS. 3 and 4.

In FIG. 3 it may be seen that the end of each vertical member 20 in the subframe is provided with a small tab 54 welded thereto. Tab 54 has a small hole 55 therein. In FIG. 4 it may be seen that the end of each V-shaped member 12 is provided with a flat resting plate 53 upon which subframe member 20 rests. Within plate 53 is a slot 56 designed to accept the end of tab 54. Once in place, the subframe is securely locked by sliding a pin 57 into the hole 55 in tab 54. Each of the V-shaped members 12 has a pin 57 connected by a tab 58 to a bar 59. As can be seen in FIG. 1, bar 59 runs the length of the press and is movable by means of an air cylinder 60 connected to bar 59 through an intermediate connecting tab 61 which is welded to bar 59. This locking mechanism insures that when the lower dies 35, 36 and 37 are raised into position by the inflatable bags 38 and 39 the pressure will not lift up the pivotable subframe assembly.

When the pivoting subframe is lifted up by cylinder 50 a pair of locking bars 62 and 63 rise with it. Bars 62 and 63 pivot about a pair of pins 64 and 65 which pins are welded to the top of the two end horizontal girders 18. At their opposite ends, locking bars 62 and 63 are provided with J-shaped slots 66 and 67 through which are inserted a pair of locking pins 68 and 69. Locking pins 68 and 69 are welded to the top of end girders 10. It is evident that as the pivoting subframe reaches its top most position, locking pins 68 and 69 are trapped in the small J-shaped trap 66a and 67a at the end of slots 66 and 67. Thus, if for some reason cylinder 50 should fail or air pressure is lost, the pivoting subframe the press. accidentally fall suddenly under its own weight back onto thepress. The pivoting subframe is allowed to drop only when the locking bars 62 and 63 are released by lifting them up with a pair of cams 70 and 71. Cams 70 and 71 rotate with a shaft 72 which in turn is rotated by an air cylinder 73 operating through a connecting link 74. The fact that locking bars 62 and 63 are locked is known to the machine since locking bars 62 drop onto a switch 80 (shown only in FIG. 6) when slot 66a drops over pin 68. No attempt is made to show switch 80 in FIG. 1 or FIG. 2 because of its position behind girder 10. However, its action will be explained in detail with respect to FIG. 6.

Figure 7:
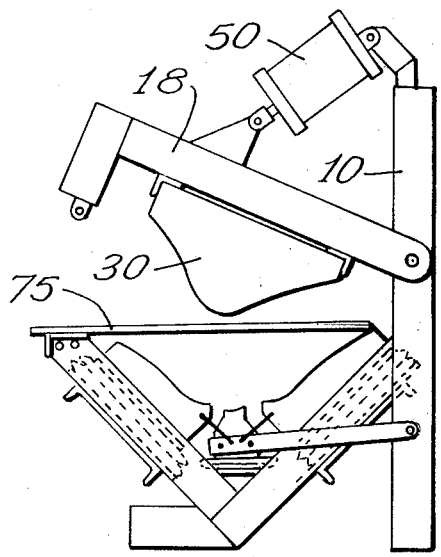
FIGS. 7, 8 and 9 show respectively subsequent steps in forming the laminated bench and subsequent positions that the press assumes in response to the schematic pressurized circuitry of FIG. 6.
Figure 8:
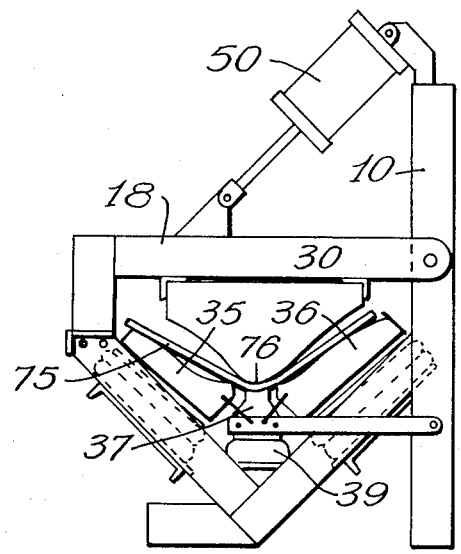
Figure 9:
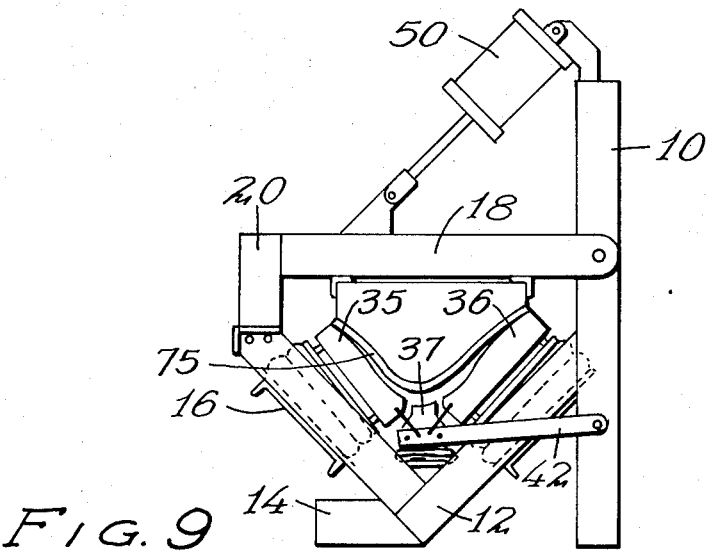

Referring to FIGS. 7, 8 and 9 the sequential operation of the press 11 be explained. The bench forming material 75 is inserted in the machine as shown in FIG. 7 with the pivoting subframe in a raised position and the lower dies retracted. As mentioned before, stock 75 may comprise several layers of wood or plastic or combinations thereof freshly glued together and ready to form. The pressurized system of the invention is activated releasing the locking bars 62 and 63 and permitting air to escape from cylinder 50. The pivoting subframe slowly lowers under its own weight bringing die 30 down against the stock 75 and bending it as shown in FIG. 8. As soon as the subframe comes to rest on the main frame locking bar 59 is activated by air cylinder 60 so as to drive pins 57 into the locking tabs 54 and hold the subframe to the main frame as explaned earlier. At this time the central die 37 is brought up by means of air bags 39 so as to securely form and hold the central sharply curved portion of the bench 76 in place. This is the condition and point of time shown in FIG. 8. The forming process is completed by bringing up dies 35 and 36 by means of air bags 38 and holding the bench in that position for a period of time sufficient to cure the glue and stabilize the structure. This time interval could extend, for example, for 8 to 10 minutes. Since the central die is the first one in position due to larger air passages from the air source, it is also the first to release as shown in FIG. 9. Following the lowering of die 37, die 35 and 36 also are allowed to retract and the subframe is unlocked and picked up once again by cylinder 50. For a complete understanding of the pressurized air system, that operates the press reference should be had to FIG. 6.

Figure 6:
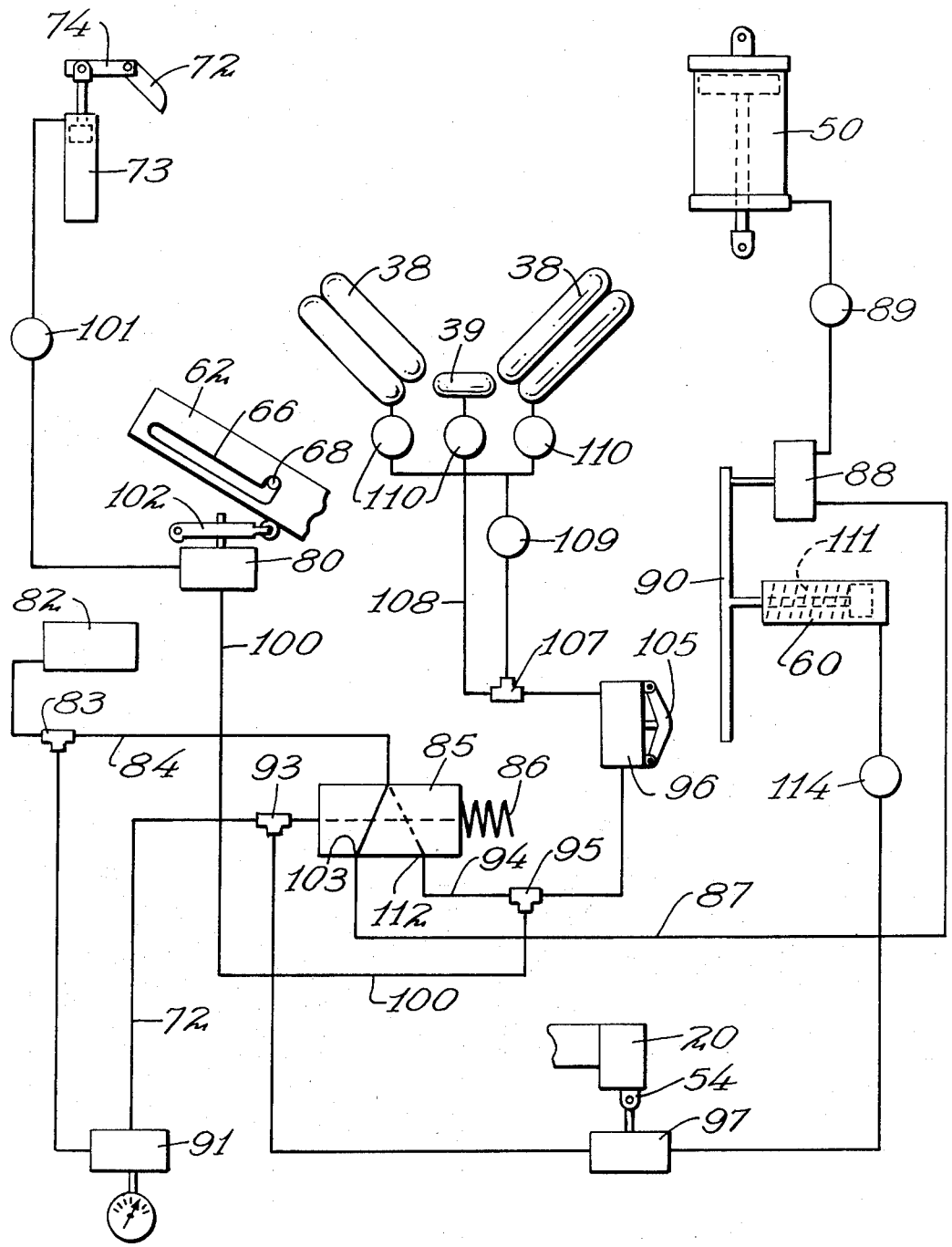
FIG. 6 is a schematic diagram of the pressurized air circuits and valves therefore which operate the press.

In FIG. 6 the pressurized air system is shown beginning with the assumption that the pivoting subframe is up and held in place both by locking bars 62 and 63 and cylinder 50. In FIG. 6 it may be seen that air pressure is directed from a source 82 through a T-connection 83 and a line 84 to a spring loaded two position valve 85. In the rest position a spring 86 holds valve 85 in a first position wherein the pressurized air passes through valve 85 to a line 87 and thence through an air switch valve 88 and a flow control 89 to cylinder 50. Flow control 89 in the preferred embodiment may comprise a simple restricted passage to prevent air from passing at too high a rate. Valve 88 is held in an on position by means of a mechanical switching bar 90 which is shown schematically in FIG. 6. Switching bar 90 is mechanically connected to locking bar 59, the action of which was explained with respect to FIG. 1. Thus, pressurized air is continually delivered to cylinder 50 to insure that it continues to hold the pivoting subframe in the up position. If the source of air should fail for one reason or another the back up safety bars 62 and 63 prevent an inadvertant dropping of the pivoting subframe. To cycle the machine a timing valve 91 is activated which opens for a predetermined period of time allowing pressurized air from source 82 and T-connection 83 to pass along a line 92 to a T-connection 93. The pressurized air from T-connection 93 activates two position valve 85, moving it against spring 86 so as to now direct the pressurized air into line 94 and to T-connection 95. This pressurized air cannot reach air bags 38 and 39 because of an intervening valve 96 which is not yet activated. Valve 96 is activated by contact with switching arm 90 upon movement of locking bar 59. Locking cylinder 60 receives pressurized air from T-connection 93 when a valve 97 is turned on. However, valve 97 is not yet activated since it is mounted within the end of one of the V-shaped girders 12 in a suitable position to be activated by the contact of tab 54 when the subframe lowers. For the purpose of clarity, switch 97 was not shown in FIG. 4 although its location would be generally underneath resting plate 53. Thus, nothing can happen until the subframe pivots down into place and is locked. This happens in the following way.

Pressurized air is now present at T-connection 95 and this is directed through a line 100, a valve 80, and a flow control 101 to cylinder 73. Since locking bar 62 is in a locked lowered position as shown, it is resting against a switch 102 and holding valve 80 open. Thus, the pressurized air is allowed to pass, activating cylinder 73 and pivoting cams 70 and 71 up to release locking bars 62 and 63. As soon as bar 62 rises, valve 80 closes off the air to cylinder 73 and cams 70 and 71 return to their lowered position. The pivoting subframe is now free to drop provided the air can escape through cylinder 50. The air does escape from cylinder 50 back through flow control 89 and out the now uncovered port 103 which has been disconnected from the source of air 82 by the movement of two position switch 85. Flow control 89 regulates the release of air from cylinder 50 and the pivoting subframe slowly lowers into position as described earlier. When it comes to rest on resting plate 53, the tab 54 contacts and activates valve 97 allowing pressurized air to flow through a flow control 104 and into locking cylinder 60. As described before cylinder 60 moves bar 59, tabs 58 and locking pins 57 into the holes 55 in the tabs 54, thus, securing the pivoting subframe to the main frame. The movement of cylinder 60 away from valve 88 closes valve 88 so that air can no longer be accidentally introduced in the cylinder 50 as perhaps could happen upon a failure of two position valve 85. Only when cylinder 60 is once again retracted, thus unlocking the pivoting subframe, is air permitted to pass through valve 88 to cylinder 50 and raise the subframe.

As cylinder 60 moves to lock the pivoting subframe to the main frame it also moves against the actuating arm 105 of valve 96. In so doing, it allows pressurized air from T-connection 95 to pass through a T-connection 107 to the air bags 38 and 39. As indicated before central air bag 39 fills first since it is connected directly to T-connection 107 by means of a line 108. Air bags 38 fill at a somewhat later time due to a flow control 109 which restricts the passage of air thereto for a sufficient interval to create the desired delay. A series of three quick release valves 110 of construction familiar to those skilled in the art are provided which will vent the air bags to the atmosphere quickly when the pressure from T-connection 107 is relieved. With the air bags 38 and 39 expanded the bench is held in the heated press for a sufficient time to cure the glue as determined by timing valve 91. When valve 91 reaches the end of its time cycle and turns off, two position switch 85 is allowed to return to its original position, thus, cutting off the supply of air to the air bags. The air from the air bags is allowed to escape through quick release valves 110 and the bags retract. When the timer valve 91 shuts off it also cuts off the supply of air to cylinder 60. A spring 111 in cylinder 60 causes the cylinder to retract slowly as the air is lost. As cylinder 60 retracts it unlocks the subframe and reengages valve 88 allowing pressurized air to pass to cylinder 50 so as to raise the subframe to its upper most position. Since air is no longer being supplied to safety cylinder 73 it does not resist the weight of safety bars 62 and 63 and they again fall into the safety locked position.

Since many variations may be made to the structure shown without departing from the spirit and scope of the invention the following claims are presented to cover only the novel and new aspects thereof.

We claim:

1. A heated automatic press for forming contoured, laminated bench seats comprising in combination:
    a main frame structure;
    a die of size and shape corresponding to the inside surface of the bench seat including the seat and back portions and the curved portion connecting the seat and back portions;
    movable subframe means movably connected to said main frame and carrying said inside die;
    first, second, and third outside dies positioned and shaped to collectively form the outside of said desired bench;

first, second, and third moving means connected respectively to said first, second, and third outside dies so as to move said outside dies against the outside surface of the bench comprising respectively the seat and back portions of the bench and the curved portion connecting the seat and back portions; and an automatic control system connected to operate the moving means and activate said third moving means to move said third outside die against said curved portion of the bench before the first and second outside dies move against the seat and back portions.

2. The press of claim 1 in which said movable subframe means comprises a subframe pivoted on said main frame above said outside dies.

3. The press of claim 1 in which said moving subframe means comprise air inflatable bags positioned between the outside dies and the main frame.

4. The press of claim 3 including radius rod locating members extending between the main frame and said third outside die and pivotable connecting links between said third outside die and said first and second outside dies to insure that the first, second and third dies collectively engage the outside surface of the bench seat in the correct position.

5. The press of claim 4 in which said movable subframe means comprises a subframe pivoted on said main frame above said outside dies.

6. The press of claim 5 including a plurality of tubes disposed in said inside die and in said outside dies, said tubes adapted to carry hot heating fluid.

7. The press of claim 3 in which said control system includes a source of pressurized air connected through first control switching means to an air cylinder mounted between the main frame and the pivoting subframe, said air cylinder adapted to pivot the subframe and the inside die away from the outside dies, and said source also connected through second control switching means to said inflatable bags.

8. The press of claim 6 in which said control system includes a source of pressurized air connected through first control switching means to an air cylinder mounted between the main frame and the pivoting subframe, said air cylinder adapted to pivot the subframe and the inside die away from the outside dies, and said source also connected through second control switching means to said inflatable bags.

9. The press of claim 8 in which said first control switching means includes a timing valve, a first safety switch, and a two way valve and said second control switching means includes a second safety switch connected to the second output of said two way valve.

10. The press of claim 9 including locking pin means to secure said subframe in the bench forming portion, said pin means connected also to control said first and second safety switches.

* * * * *